United States Patent
Alfermann et al.

(10) Patent No.: US 7,705,495 B2
(45) Date of Patent: Apr. 27, 2010

(54) COOLING SYSTEM FOR AN ELECTRIC MOTOR

(75) Inventors: Timothy J. Alfermann, Fishers, IN (US); Arthur L. McGrew, Jr., Plainfield, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 447 days.

(21) Appl. No.: 11/561,083

(22) Filed: Nov. 17, 2006

(65) Prior Publication Data

US 2008/0136271 A1 Jun. 12, 2008

(51) Int. Cl.
  *H02K 9/00* (2006.01)
(52) U.S. Cl. .......................................... 310/59; 310/52
(58) Field of Classification Search .................. 310/43, 310/52–54, 57–59, 261, 62–63, 254
  See application file for complete search history.

(56) References Cited

U.S. PATENT DOCUMENTS 2,891,391 A * 6/1959 Grant et al. .................... 62/475
2,917,644 A * 12/1959 Laffoon et al. ................ 310/64
3,475,631 A * 10/1969 Bollibon et al. ............... 310/58
3,675,056 A * 7/1972 Lenz ............................. 310/54
3,681,628 A * 8/1972 Krastchew .................... 310/54
3,727,085 A * 4/1973 Goetz et al. ................... 310/54
3,801,843 A * 4/1974 Corman et al. ................ 310/52
4,496,862 A * 1/1985 Weber .......................... 310/56
4,994,700 A * 2/1991 Bansal et al. ................ 310/215
5,237,227 A * 8/1993 Huss ............................ 310/54

* cited by examiner

*Primary Examiner*—Thanh Lam

(57) ABSTRACT

The present invention provides a stator assembly for an electromechanical hybrid transmission. The stator assembly is generally annular and defines a centrally located rotor aperture configured to accommodate a rotor. The stator assembly includes a stator core having a plurality of radially inwardly extending stator teeth, and a stator wire wound around each of the stator teeth to form a plurality of stator coils. Epoxy resin is applied between each pair of adjacent stator teeth. The epoxy resin defines a plurality of stator cooling channels located in close proximity to the stator coils, and a plurality of rotor cooling channels located in close proximity to the rotor aperture. A cooling medium is disposed within the stator cooling channels and the rotor cooling channels such that the stator coils and a later assembled rotor can be cooled.

11 Claims, 3 Drawing Sheets

COOLING SYSTEM FOR AN ELECTRIC MOTOR

GOVERNMENT LICENSE RIGHTS

The U.S. Government has a paid-up license in this invention and the right in limited circumstances to require the patent owner to license others on reasonable terms as provided for by the terms of ZCL-3-32060-02 awarded by NREL/DOE.

TECHNICAL FIELD

The present invention pertains generally to an electric motor and more specifically to a system for cooling the electric motor.

BACKGROUND OF THE INVENTION

Electric devices such as motors and generators having a stator secured within a housing of the motor/generator are well known. A rotor mounted on a shaft is coaxially positioned within the stator and is rotatable relative to the stator about the longitudinal axis of the shaft. The passage of current through the stator creates a magnetic field tending to rotate the rotor and shaft. It is also well known that it is necessary to maintain the stator and the rotor within a predefined temperature range in order to ensure optimal performance and reliability of the electric device.

SUMMARY OF THE INVENTION

The present invention provides a stator assembly for an electromechanical hybrid transmission. The stator assembly is generally annular and defines a centrally located rotor aperture configured to accommodate a rotor. The stator assembly includes a stator core having a plurality of radially inwardly extending stator teeth, and a stator wire wound around each of the stator teeth to form a plurality of stator coils. Epoxy resin is applied between each pair of adjacent stator teeth. The epoxy resin defines a plurality of stator cooling channels located in close proximity to the stator coils, and a plurality of rotor cooling channels located in close proximity to the rotor aperture. A cooling medium is disposed within the stator cooling channels and the rotor cooling channels such that the stator coils and a later assembled rotor can be cooled. A plurality of rotor spray holes in fluid communication with the plurality of rotor cooling channels are configured to transfer a predetermined amount of cooling medium onto the rotor. A preferred method and an alternate method for producing the stator assembly are also provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
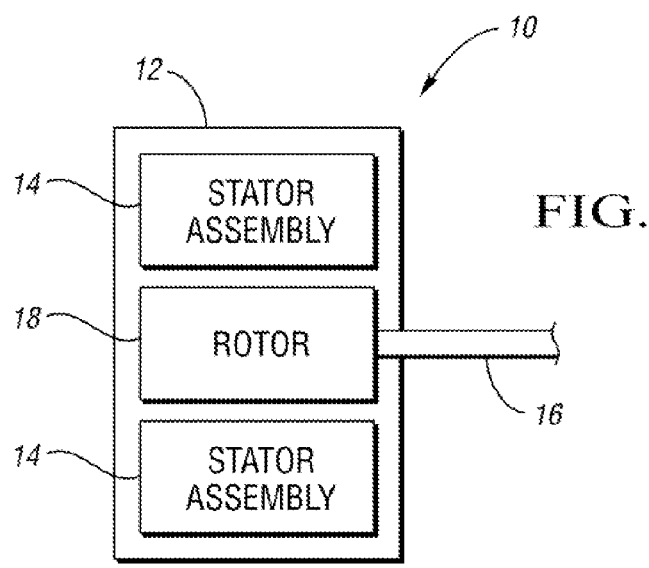
FIG. 1 is a schematic cross-sectional diagram of an electric motor.

Referring to the drawings wherein like reference numbers represent the same or similar components throughout the several figures, there is shown in FIG. 1 a schematic representation of an electric motor 10. The electric motor 10 is shown for illustrative purposes in accordance with the preferred embodiment; however it should be appreciated the present invention is adapted for use with other electric motor configurations and other electrical devices such as, for example, a generator. The electric motor 10 includes a housing 12, a stator assembly 14, a shaft 16, and a rotor 18. The stator assembly 14 is substantially annular and is configured to remain stationary relative to the housing 12 during operation of the motor 10. The rotor 18 is fixed to the shaft 16 for unitary rotation therewith and is generally circumscribed by the stator 14. The rotor 18 and shaft 16 are rotatable relative to the housing 12 and the stator 14.

Figure 2:
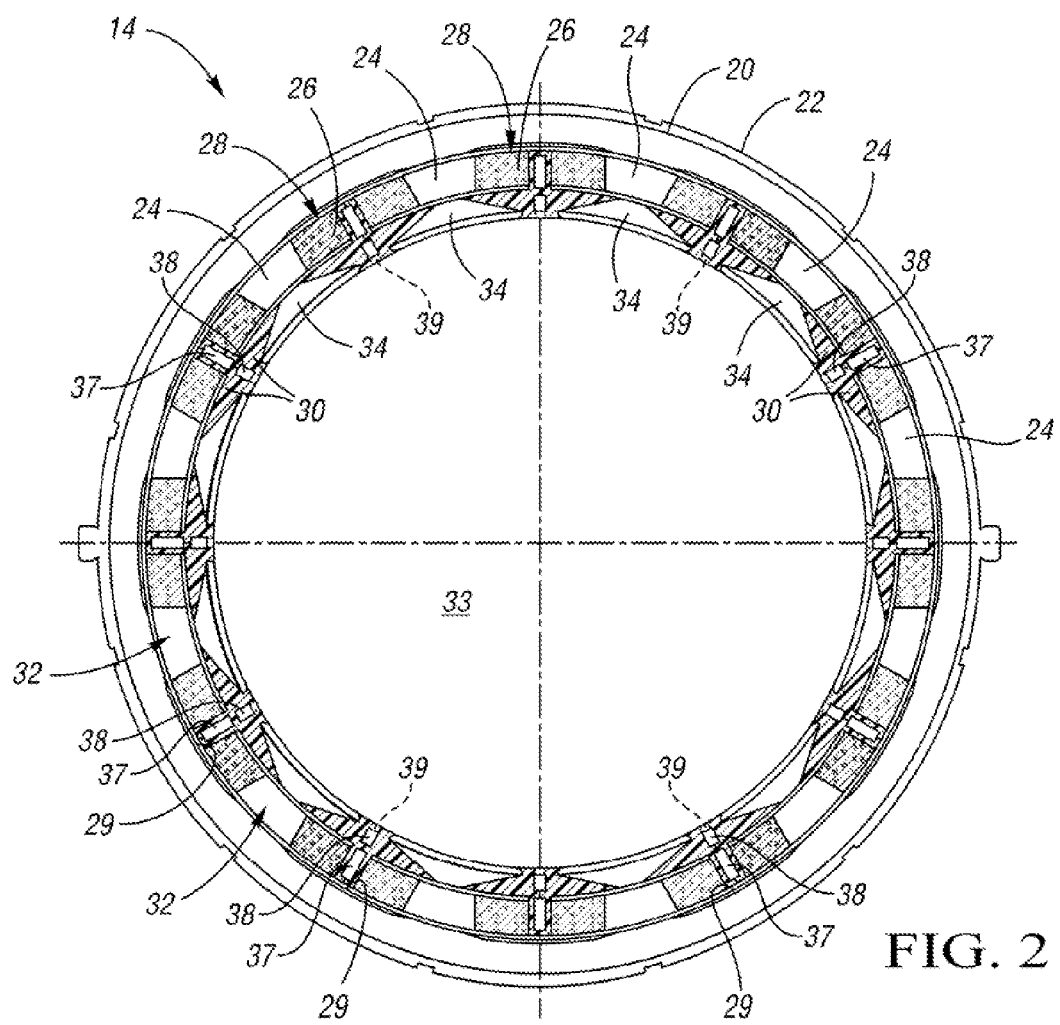
FIG. 2 is a sectional view of a stator assembly.

Referring to FIG. 2, the stator assembly 14 preferably includes a stator core 20 contained within a stator sleeve or shell 22. The stator core 20 includes a plurality of stator teeth 24 extending in a radially inward direction. A stator wire 26 is wound or wrapped around each of the stator teeth 24 to form a stator coil 28. For purposes of the present invention, the phrase "a stator wire" may refer to a single wire wound around each of a plurality of stator teeth 24, or alternatively may refer to a plurality of stator wires 26 which are each wound around a single stator tooth 24 and then connected together.

The stator coil 28 is impregnated with epoxy resin 30 such that the windings of the stator coil 28 are electrically isolated from each other. An epoxy resin type 66-2251 commercially available from Wabash Magnetics LLC., located at 1450 First Street, Wabash, Ind. 46992, is preferably implemented for the epoxy resin 30. According to a preferred embodiment, the stator core 20 is composed of a soft magnetic composite (SMC) to reduce cost and simplify manufacturing, and the stator wire 26 is composed of copper. According to an alternate embodiment, the stator core 20 may be composed of steel laminations. The addition of the epoxy resin 30 in the manner described hereinabove increases the strength of the stator assembly 14 and provides additional damping. This increase in strength of the stator assembly 14 is particularly advantageous for the preferred embodiment wherein the stator core 20 is composed of a soft magnetic composite. The damping characteristics of the epoxy resin 30 allows for the absorption of vibrations generated by the electric motor 10 that may otherwise be objectionable thereby providing smoother operation. It should be appreciated; however, that alternate epoxy resin, stator core and/or stator wire compositions may be envisioned.

With continued reference to FIG. 2, each stator tooth 24 and stator coil 28 will together be referred to as a "pole" 32. Each pole 32 is preferably wound separately to maximize the number of windings within a given slot volume, sometimes referred to as slot fill, thereby optimizing the performance of the electric motor 10 (shown in FIG. 1). The stator 14, as shown, includes twelve poles 32; however, those skilled in the art will recognize that more or fewer poles 32 may be provide while remaining within the scope of that which is claimed. The twelve poles 32 are held in relation to one another by the shell 22 and the respective stator coils 28 are electrically interconnected such that current is transferable between poles 32. The stator teeth 24 each terminate in a flanged end portion 34. The flanged end portions 34 of the twelve poles 32 define a centrally located rotor aperture 33 adapted to accommodate the rotor 18 (shown in FIG. 1).

Figure 5:
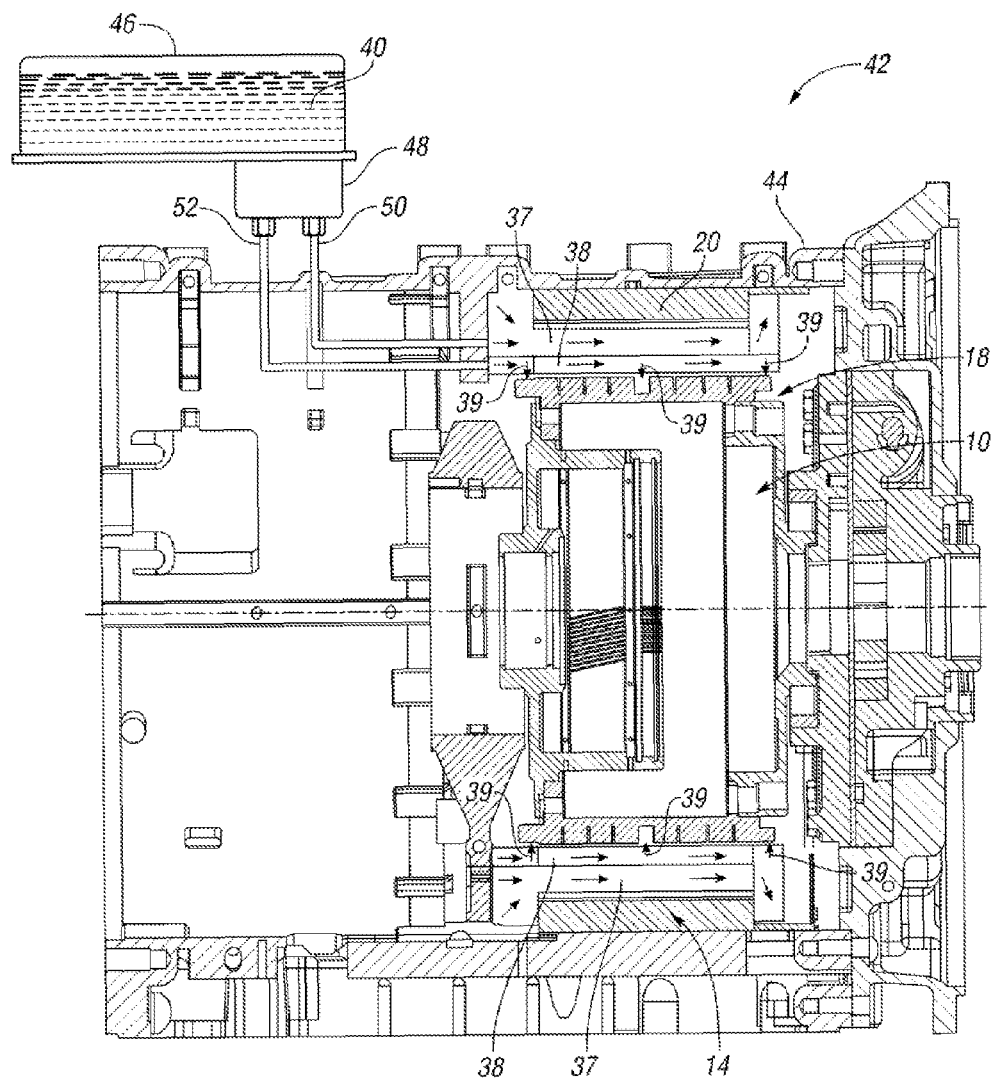
FIG. 5 is a partial cross sectional side view of an electromechanical hybrid transmission incorporating the stator assembly of FIG. 2.

A plurality of stator cooling channels 37, rotor cooling channels 38, and rotor spray holes 39 are preferably defined by the epoxy resin 30 and are provided to cool the electric motor 10 (shown in FIG. 1). A cooling medium such as the oil 40 (shown in FIG. 5) is circulated through the stator cooling channels 37 to absorb heat generated by the stator 14. As the stator coils 28 are a primary source of heat, the proximity of the stator cooling channels 37 thereto operates to efficiently cool the stator 14. Oil 40 is also transferred into the rotor cooling channels 38, through the spray holes 39, and onto the rotor 18 (shown in FIG. 5) in order to cool the rotor 18. The size, quantity, and position of the spray holes 39 may be varied to best meet the cooling requirements of a particular application. As best shown in FIG. 5, the spray holes 39 are preferably positioned near the axial ends of the rotor 18.

Figure 3:
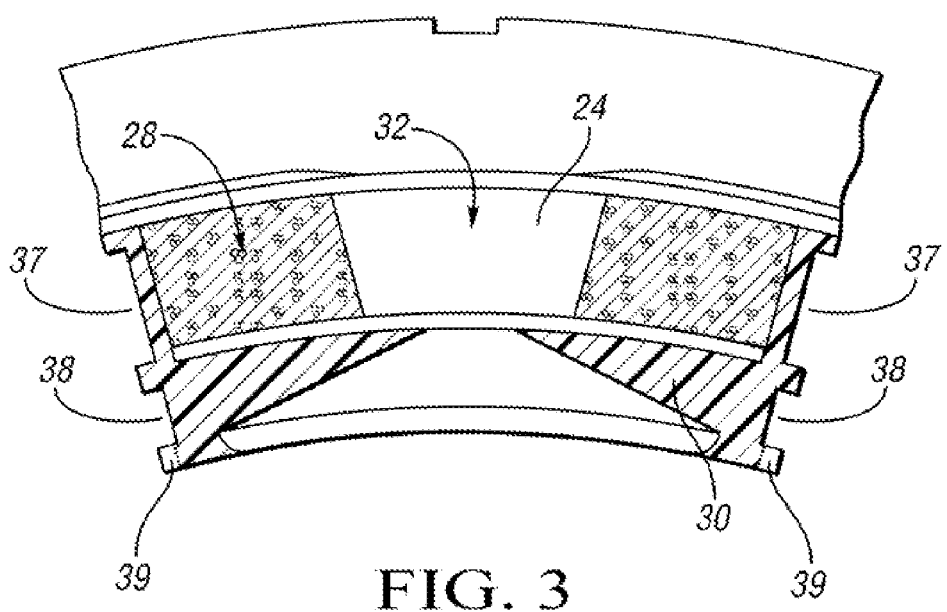
FIG. 3 is a more detailed sectional view of the stator assembly of FIG. 2 in accordance with a preferred embodiment of the present invention.

Referring to FIG. 3, a preferred method for producing the channels 37, 38 and the holes 39 is shown. According to the preferred method, a single layer of epoxy resin 30 is applied to each pole 32 in order to impregnate the coil 28 and cover the tooth 24 in the manner shown, and thereafter the poles 32 are assembled together to completely define the channels 37, 38 and the holes 39. The application of the epoxy resin 30 defines one half of a stator cooling channel 37 and one half of a rotor cooling channel 38 at opposing end portions of each pole 32. When two adjacent epoxy covered poles 32 are assembled together, a complete stator cooling channel 37 and a complete rotor cooling channel 38 are formed. Therefore, by applying epoxy resin 30 to each pole 32 in the manner described and then assembling the poles 32 to produce the stator assembly 14 (shown in FIG. 2), a complete stator cooling channel 37 and a complete rotor cooling channel 38 are formed are formed between each pair of adjacent poles 32. The rotor spray holes 39 may be formed during the application of the epoxy resin 30, or alternatively may be formed using a machining process after the epoxy resin 30 solidifies.

Figure 4:
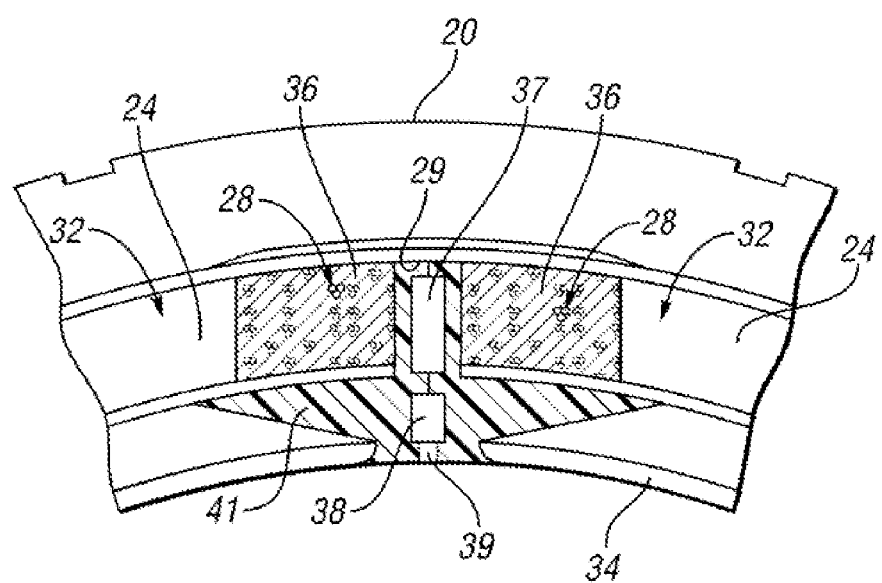
FIG. 4 is a more detailed sectional view of the stator assembly of FIG. 2 in accordance with an alternate embodiment of the present invention.

Referring to FIG. 4, an alternate method for producing the channels 37, 38 and the holes 39 is shown. According to the alternate method, the stator coil 28 of each pole 32 is impregnated with a first layer of epoxy resin 36, and then a plurality of the poles 32 are assembled together in a circular pattern. A second layer of epoxy resin 41 is applied to the pre-assembled poles 32 in order to define the stator cooling channels 37, the rotor cooling channels 38, and the rotor spray holes 39. The second layer of epoxy resin 41 is preferably applied in an "over-mold" process during which one or more inserts (not shown) are implemented to define the cooling channels 37, 38 and the spray holes 39. More precisely, the inserts are introduced between adjacent poles 32; then the second layer of epoxy resin 41 is applied over the pre-assembled poles 32 in the region radially defined between the inner wall 29 of the stator core 20 and the flanged end portions 34 of the stator teeth 24; and the inserts are removed after the epoxy resin 36 solidifies. According to an alternate embodiment, one or more of the cooling channels 37, 38 and the spray holes 39 may be formed after the epoxy resin 36 solidifies with a machining process instead of using inserts.

Referring now to FIG. 5 there is shown a partial cross sectional view of a portion of an exemplary electromechanical hybrid transmission 42. The electromechanical hybrid transmission 42 includes a housing 44 sufficiently configured to house two motor units 10, only one of which is shown in FIG. 5. Those skilled in the art will recognize that the motor units 10 may at times be used as generator units depending on the operating mode of the vehicle equipped with the electromechanical hybrid transmission 42. As discussed with reference to FIG. 1, the stator 14 is coaxially disposed about the rotor 18.

A coolant reservoir 46 is provided to retain a cooling medium such as the oil 40. The coolant reservoir 46 is preferably the transmission sump which is also configured to meet the cooling, pressure and lubrication requirements of the transmission 42. A pump 48 transfers oil 40, indicated by arrows, via a first fluid flow passage 50 to the stator cooling channels 37 and via a second fluid flow passage 52 to the rotor cooling channels 38. The pump 48 is operable to transfer a selectable amount of oil 40 through the first flow passage 50 and through the stator cooling channels 37 such that the stator 14 is sufficiently cooled. After passing through the stator cooling channels 37, the oil 40 may be returned to the reservoir 46 or implemented to meet any other cooling, lubrication and/or pressure requirements. The pump 48 is also operable to transfer a selectable amount of oil 40 through the second flow passage 52, through the rotor cooling channels 38, through the spray holes 39, and onto the rotor 18 such that the rotor 18 is sufficiently cooled. The present system for cooling both the stator 14 and the rotor 18 is adapted to maintain optimal performance and reliability of the electric motor 10.

While the best modes for carrying out the invention have been described in detail, those familiar with the art to which this invention relates will recognize various alternative designs and embodiments for practicing the invention within the scope of the appended claims.

The invention claimed is:

1. A generally annular stator assembly defining a centrally located rotor aperture configured to accommodate a rotor, said stator assembly comprising:
   a stator core including a plurality of radially inwardly extending stator teeth;
   a stator wire wound around each of said plurality of stator teeth to form a plurality of stator coils;
   epoxy resin disposed between each pair of adjacent stator teeth, said epoxy resin defining a plurality of stator cooling channels located in close proximity to the stator coils, said epoxy resin further defining a plurality of rotor cooling channels located in close proximity to the rotor aperture; and
   a cooling medium disposed within the stator cooling channels and the rotor cooling channels such that the stator coils and a later assembled rotor located in the rotor aperture can be cooled.

2. The stator assembly of claim 1, wherein said cooling medium is oil.

3. The stator assembly of claim 2, wherein said epoxy resin further defines a plurality of rotor spray holes in fluid communication with the plurality of rotor cooling channels, said rotor spray holes configured to transfer a predetermined amount of oil from the plurality of rotor cooling channels into the rotor aperture such that the later assembled rotor can be cooled.

4. An electromechanical hybrid transmission comprising:
   a rotor;
   a generally annular stator assembly generally circumscribing the rotor, said stator assembly including:
   a stator core including a plurality of radially inwardly extending stator teeth;

a stator wire wound around each of said plurality of stator teeth to form a plurality of stator coils; and epoxy resin disposed between each pair of adjacent stator teeth, said epoxy resin defining a plurality of stator cooling channels located in close proximity to the stator coils, said epoxy resin further defining a plurality of rotor cooling channels located in close proximity to the rotor; and a cooling medium disposed within the stator cooling channels and the rotor cooling channels in order to cool the stator coils and the rotor.

5. The electromechanical hybrid transmission of claim 4, wherein said epoxy resin further defines a plurality of rotor spray holes in fluid communication with the plurality of rotor cooling channels, said rotor spray holes configured to transfer a predetermined amount of said cooling medium from the plurality of rotor cooling channels onto the rotor such that the rotor is cooled.

6. The electromechanical hybrid transmission of claim 4, wherein said cooling medium is oil.

7. The electromechanical hybrid transmission of claim 4, further comprising a coolant reservoir in fluid communication with said plurality of stator cooling channels and said plurality of rotor cooling channels, said coolant reservoir configured to retain said cooling medium.

8. The electromechanical hybrid transmission of claim 7, further comprising a pump in fluid communication with said coolant reservoir, said pump configured to transfer a selectable amount of the cooling medium through said plurality of stator cooling channels and said plurality of rotor cooling channels.

9. The stator assembly of claim 1, wherein said epoxy resin is a single layer.

10. The stator assembly of claim 1, wherein said epoxy resin includes a first layer and a second layer.

11. The electromechanical hybrid transmission of claim 4, wherein said electromechanical hybrid transmission houses two motor units.

* * * * *